United States Patent
Segredo et al.

(10) Patent No.: US 9,935,704 B2
(45) Date of Patent: Apr. 3, 2018

(54) PRO-ACTIVE MESSAGE ACKNOWLEDGEMENT COLLECTION FOR IMPROVED DATA LINK PREFORMANCE OVER RELIABLE TRANSPORT MEDIA

(71) Applicants: Raul Segredo, Miami, FL (US); Jeroen Hoppenbrouwers, Miami, FL (US); Anthony Rios, Miami, FL (US)

(72) Inventors: Raul Segredo, Miami, FL (US); Jeroen Hoppenbrouwers, Miami, FL (US); Anthony Rios, Miami, FL (US)

(73) Assignee: Avionica, Inc., Miami, FL (US)

( * ) Notice: Subject to any disclaimer, the term of this patent is extended or adjusted under 35 U.S.C. 154(b) by 670 days.

(21) Appl. No.: 13/863,381

(22) Filed: Apr. 16, 2013

(65) Prior Publication Data

US 2014/0307620 A1    Oct. 16, 2014

(51) Int. Cl.
  *H04B 7/185*    (2006.01)
(52) U.S. Cl.
  CPC ....... *H04B 7/18534* (2013.01); *H04B 7/1851* (2013.01); *H04B 7/18508* (2013.01)
(58) Field of Classification Search
  CPC ............ H04B 7/18582; H04B 7/18584; H04B 7/18508; H04B 7/18515; H04B 7/18576
  See application file for complete search history.

(56) References Cited

U.S. PATENT DOCUMENTS

| | | | |
|---|---|---|---|
| 6,674,398 B2 * | 1/2004 | Murphy | 342/357.21 |
| 8,655,951 B2 * | 2/2014 | Sloop | G01C 21/3691 340/471 |
| 2003/0067409 A1 * | 4/2003 | Murphy | 342/357.01 |
| 2004/0153664 A1 * | 8/2004 | Rossler | G06F 21/6218 726/26 |
| 2005/0147057 A1 * | 7/2005 | LaDue | 370/310 |
| 2006/0240818 A1 * | 10/2006 | McCoy et al. | 455/430 |
| 2007/0293149 A1 * | 12/2007 | Wubker | 455/13.2 |
| 2009/0281929 A1 * | 11/2009 | Boitet | G06Q 10/087 705/28 |
| 2010/0027769 A1 * | 2/2010 | Stevens | G06F 21/6218 379/88.17 |
| 2010/0214960 A1 * | 8/2010 | Bahr | H04L 45/00 370/255 |

(Continued)

FOREIGN PATENT DOCUMENTS

EP         0982 876    *    8/1998    ............ H04B 7/185

*Primary Examiner* — Hassan Phillips
*Assistant Examiner* — Prenell Jones
(74) *Attorney, Agent, or Firm* — Adam C. Underwood

(57) ABSTRACT

A computer implemented method and computer program product for improved data link performance over reliable transport media in a satellite-based global telecommunications network (e.g., Short Burst Data (SBD) transaction network) to reduce downlink latency includes sending a message over reliable transport media in the satellite-based global telecommunications network, polling for a response to the sent message and receiving the response to the sent message. In an aspect of the embodiment, the method can further include polling when a message alert notification is not received. In another aspect of the embodiment, the method can further include polling a single time. In yet another aspect of the embodiment, the method can include polling when a message alert timeout counter elapses.

15 Claims, 4 Drawing Sheets

(56) References Cited

U.S. PATENT DOCUMENTS

| | | | |
|---|---|---|---|
| 2011/0022475 A1* | 1/2011 | Inbar | G06Q 30/02 |
| | | | 705/14.66 |
| 2011/0257819 A1* | 10/2011 | Chen et al. | 701/21 |
| 2013/0042025 A1* | 2/2013 | Ennesser | G06F 13/102 |
| | | | 710/5 |
| 2014/0066120 A1* | 3/2014 | Sharma | H04W 88/06 |
| | | | 455/552.1 |
| 2014/0105260 A1* | 4/2014 | May-Weymann | H04L 69/321 |
| | | | 375/222 |
| 2014/0214445 A1* | 7/2014 | Rowe | G06Q 10/06 |
| | | | 705/2 |
| 2014/0225750 A1* | 8/2014 | Sloop | G01C 21/3691 |
| | | | 340/905 |
| 2015/0106349 A1* | 4/2015 | Kitamorn | G06F 17/30867 |
| | | | 707/706 |

* cited by examiner

PRO-ACTIVE MESSAGE ACKNOWLEDGEMENT COLLECTION FOR IMPROVED DATA LINK PREFORMANCE OVER RELIABLE TRANSPORT MEDIA

BACKGROUND OF THE INVENTION

Field of the Invention

The present invention relates to satellite-based global telecommunications networks and more particularly to pro-active message acknowledgement collection for improved downlink performance over reliable transport media in satellite-based global telecommunications networks.

Description of the Related Art

With the development of a global economy, commercial satellite-based global telecommunications networks have been developed. These networks typically provide both voice (telephone) and data link (messaging) services. One of the first of such networks has been operated by Iridium LLC since Nov. 1, 1998. The international aviation community has been using the Iridium global satellite network to provide worldwide voice and data services between airlines, air traffic control centers, and aircraft.

The data link services of the Iridium satellite network can be either circuit-switched, using the voice system to set up a dial-up data link, or message-switched, using either the Short message Service (SMS) or the Short Burst Data (SBD) techniques. The international aviation community has selected the SBD service to build the satellite-based extension of the worldwide Aircraft Communications Addressing and Reporting System (ACARS). As this service matured and operational data became available on data link performance over Iridium SBD, some issues became apparent.

ACARS has been originally developed with unreliable transport media in mind. Traditional broadcast radio on Very High Frequency (VHF) radio bands by itself does not guarantee the correct and complete reception of any broadcast message. Therefore, ACARS implemented a two-phase message protocol, where each sent message must be individually acknowledged by a specific response. When this protocol was implemented on the reliable transport media of the Iridium SBD system, the same send-response mechanism was used. Under certain conditions, the selected implementation leads to sub-optimal performance of the overall data link. In particular, successfully transmitted messages may remain unacknowledged due to a peculiarity in the Iridium SBD signaling system. The current implementation of the ACARS-over-Iridium-SBD system does not handle this anomaly gracefully and reverts to the backup approach of re-sending the message after 180 seconds. During this waiting time, the complete data link is blocked. The present invention offers a solution to this data link blocking that (a) offers a significant improvement of the existing ACARS-over-Iridium-SBD performance, (b) offers a less costly alternative to the 180 second re-send approach, and (c) does not need any change in existing satellite or ground equipment, while allowing existing airborne equipment to remain unchanged at the operator's discretion.

BRIEF SUMMARY OF THE INVENTION

Embodiments of the present invention address deficiencies of the art in respect to satellite downlink performance (e.g., short burst data (SBD) transactions) and provide a novel and non-obvious method, system and computer program product for reducing downlink latency in a satellite-based global telecommunications network using pro-active message acknowledgement collection. In an embodiment of the invention, a computer implemented method for pro-active message acknowledgment collection for improved data link performance over reliable transport media in a satellite-based global telecommunications network to reduce downlink latency, includes sending a message over reliable transport media in the satellite-based global telecommunications network, polling for a response to the sent message and receiving the response to the sent message. In an aspect of the embodiment, the method can further include polling when a message alert notification is not received. In another aspect of the embodiment, the method can further include polling a single time. In yet another aspect of the embodiment, the method can include polling when a message alert timeout counter elapses.

In another embodiment of the invention, a computer implemented method for reducing downlink latency in a satellite-based global telecommunications network by use of a virtual message waiting acknowledgement, includes receiving a message from a message client, performing a bi-directional transaction (e.g., SBD transaction) with the satellite-based global telecommunications network, validating the success of the bi-directional transaction (e.g., SBD transaction), determining if a message alert notification (e.g., SBD RING) was transmitted by the satellite-based global telecommunications network, performing a second bi-directional transaction (e.g., SBD transaction) with the satellite-based global telecommunications network and requesting a message receipt acknowledgement from a service provider and upon validating the success of the second SBD transaction; forwarding the message receipt acknowledgement from a service provider to the message client. In another aspect of the embodiment, the method can include setting a virtual message alert timeout counter. In yet another aspect of the embodiment, the method can include determining if the virtual message alert acknowledgement timeout counter has expired.

In accordance with another aspect, the present invention provides a computer program product for reducing downlink latency in a satellite-based global telecommunications network by use of a virtual message acknowledgement. The method includes performing a bi-directional transaction (e.g., SBD transaction) with the satellite-based global telecommunications network, validating the success of the bi-directional transaction (e.g., SBD transaction), determining if a message alert notification (e.g., SBD RING) was transmitted by the satellite-based global telecommunications network, performing a second bi-directional transaction (e.g., SBD transaction) with the satellite-based global telecommunications network and upon validating the success of the second bi-directional transaction (e.g., SBD transaction); forwarding a message receipt acknowledgement from a service provider to the message client. In another aspect of the embodiment, the method can include requesting a message receipt acknowledgement from a service provider. In yet another aspect of the embodiment, the method can include setting a virtual message alert timeout counter. In yet another aspect of the embodiment, the method can include determining if the virtual message alert acknowledgement timeout counter has expired.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for method, system and computer program product for reducing SBD downlink latency in a satellite-based global telecommunications network using pro-active message acknowledgement collection. In an embodiment of the invention, a computer implemented method for pro-active message acknowledgment collection for improved data link performance over reliable transport media in a satellite-based global telecommunications network to reduce downlink latency, includes sending a message over reliable transport media in the satellite-based global telecommunications network, polling for a response to the sent message and receiving the response to the sent message. In an aspect of the embodiment, the method can further include polling when a message alert notification is not received. In another aspect of the embodiment, the method can further include polling a single time. In yet another aspect of the embodiment, the method can include polling when a message alert timeout counter elapses In an embodiment of the invention, a computer implemented method for reducing downlink latency in a satellite-based global telecommunications network by use of a virtual message waiting acknowledgement, includes receiving a message from a message client, performing a bi-directional transaction (e.g., SBD transaction) with the satellite-based global telecommunications network, validating the success of the bi-directional transaction (e.g., SBD transaction), determining if a message alert notification (e.g., SBD RING) was transmitted by the satellite-based global telecommunications network, performing a second bi-directional transaction (e.g., SBD transaction) with the satellite-based global telecommunications network and requesting a message receipt acknowledgement from a service provider and upon validating the success of the second SBD transaction; forwarding the message receipt acknowledgement from a service provider to the message client. In another aspect of the embodiment, the method can include setting a virtual message alert timeout counter. In yet another aspect of the embodiment, the method can include determining if the virtual message alert acknowledgement timeout counter has expired.

To understand the method for a computer implemented method for reducing downlink latency (e.g., Short Burst Data (SBD)) in a satellite-based global telecommunications network by use of a virtual message alert notification (e.g., a virtual SBD RING acknowledgement) in accordance with the present invention, first an embodiment of the telecommunications system which may use the present invention needs to be described.

Figure 1:
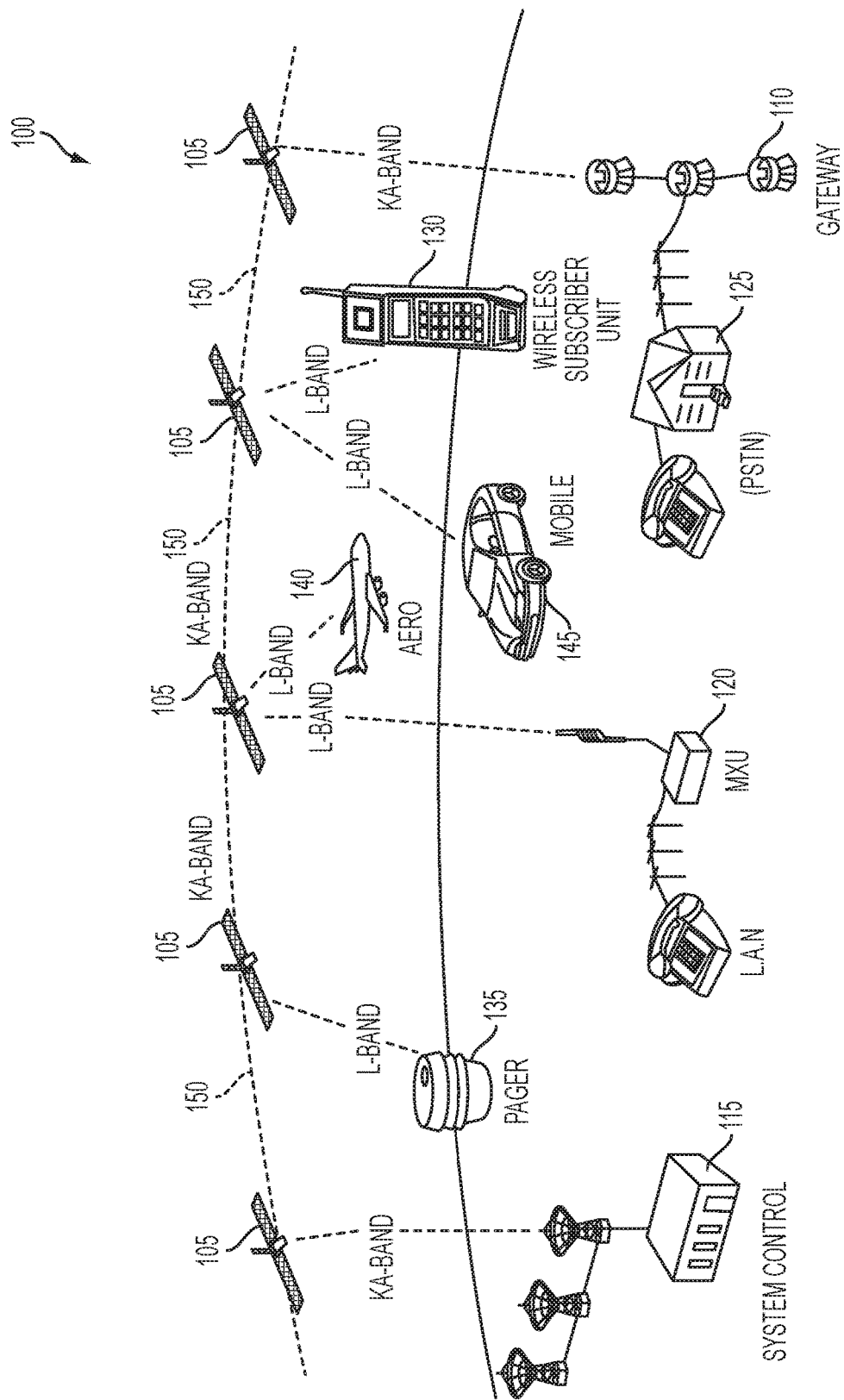
FIG. 1 is a pictorial illustration of a global telecommunications network which may use the present invention.

FIG. 1 illustrates a telecommunications system which may be used with the present invention. The system 100 includes low earth orbiting satellites 105, gateways 110, and system control 115. System Control 115 serves as the central management component for the system 100. Gateways 110 interconnect the satellite constellation 105 with public switched telephone networks 125 (PSTN), making communication possible between system wireless subscriber units (WSU) 130, such as a wireless phone or a fixed wireless device, and any other telephone in the world. Telecommunications services may also be provided to pagers 135, aircrafts 140, and automobiles 145. Satellite Data Units (SDU) 402 may reside in the pagers 135, aircrafts 140, and automobiles 145. SDUs 402 pass message envelopes from a message client 401 to a satellite-based global telecommunications network 403 (e.g., the Iridium satellite network). In the Iridium satellite network 403, the downlink and uplink messages are combined in bi-directional transactions 416a, 416b and 466a, 466b.

The satellites 105 of the system 100 employ intersatellite links 150, or "crosslinks", to communicate directly with each other. These crosslinks 150 provide reliable, high-speed communications between neighboring satellites, allowing call routing and administration to occur efficiently.

Figure 2:
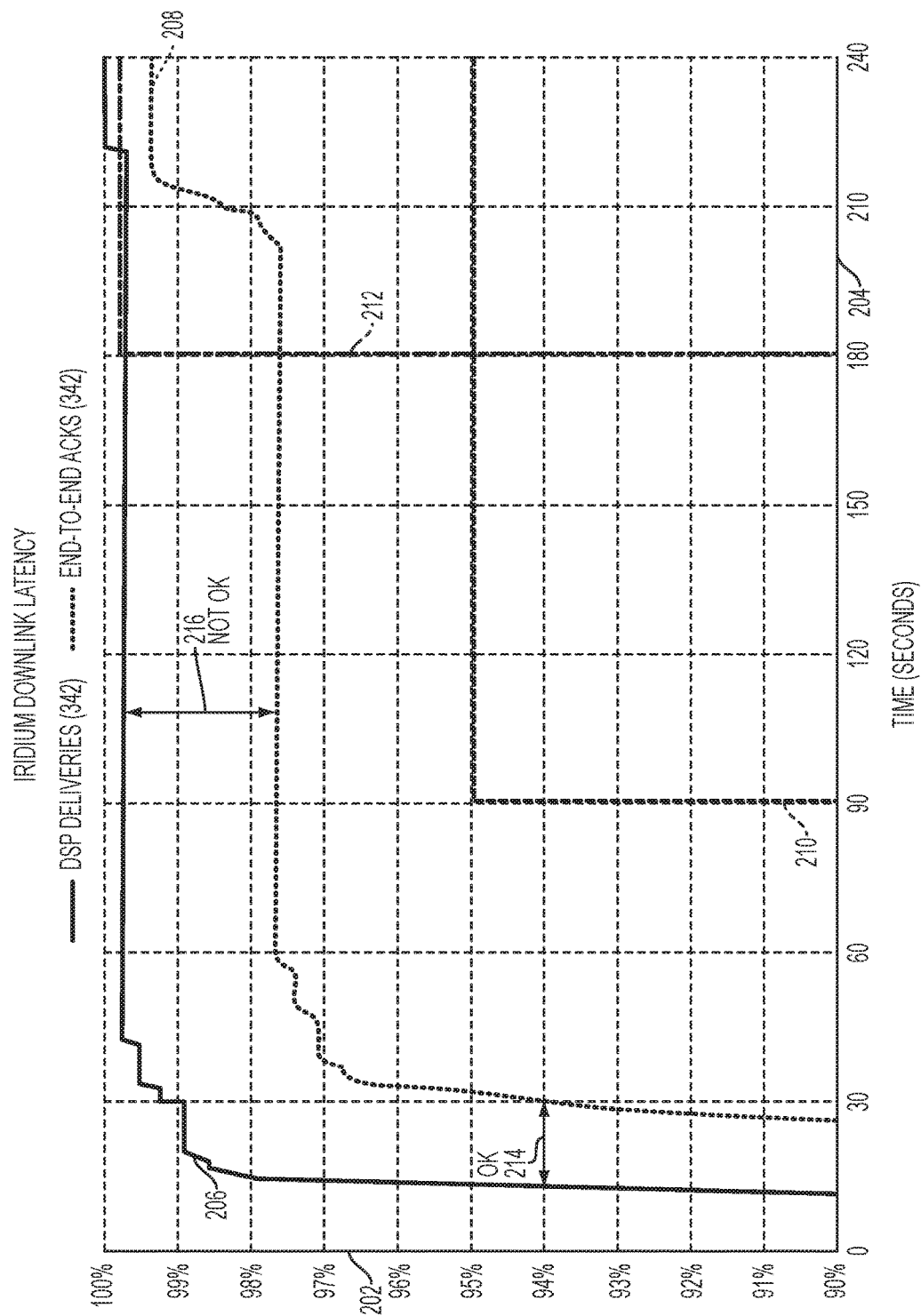
FIG. 2 is a graph of the typical downlink latency of a global telecommunications network.

FIG. 2 is a graph of the typical downlink latency of a global telecommunications network. As illustrated by FIG. 2, the downlink performance 206 (solid line) was much better than the end-to-end downlink plus uplink performance 208 (dotted line), indicating an issue with the uplinked acknowledgements. Both downlink and uplink are exactly the same kind of bidirectional transaction (e.g., SBD transaction); however, a difference in the performance is noticeable. In addition, the uplink performance 208 (dotted line) catches up to the downlink performance 206 (solid line) at about 210 seconds. An analysis of the ACARS protocol (ARINC 618) indicates that the bump at 210 seconds came from the downlink message retry timer at 180 seconds. If for whatever reason the downlinked message was not acknowledged by the ground within 180 seconds, the same message would be downlinked again, which typically would successfully trigger an acknowledge (message waiting notification or alert (e.g., virtual SDB RING)). The graph 200 has an x-axis 204 to denote time in seconds and a y-axis 202 to denote the delivery rate of the messages. The horizontal gap 214 between the uplink performance 208 and the downlink performance 206 is approximately 15 seconds and within the expected range. The vertical gap 216 between the uplink performance 208 and the downlink performance 206 illustrates a significant drop off in performance of the uplink end-to-end message waiting notification or alert (e.g., virtual SDB RING). There are two delivery cliffs illustrated in FIG. 2, a 95%-within-90-seconds cliff 210 and a 99.9%-within-180-seconds cliff 212, which are the targets of the industry.

Figure 3:
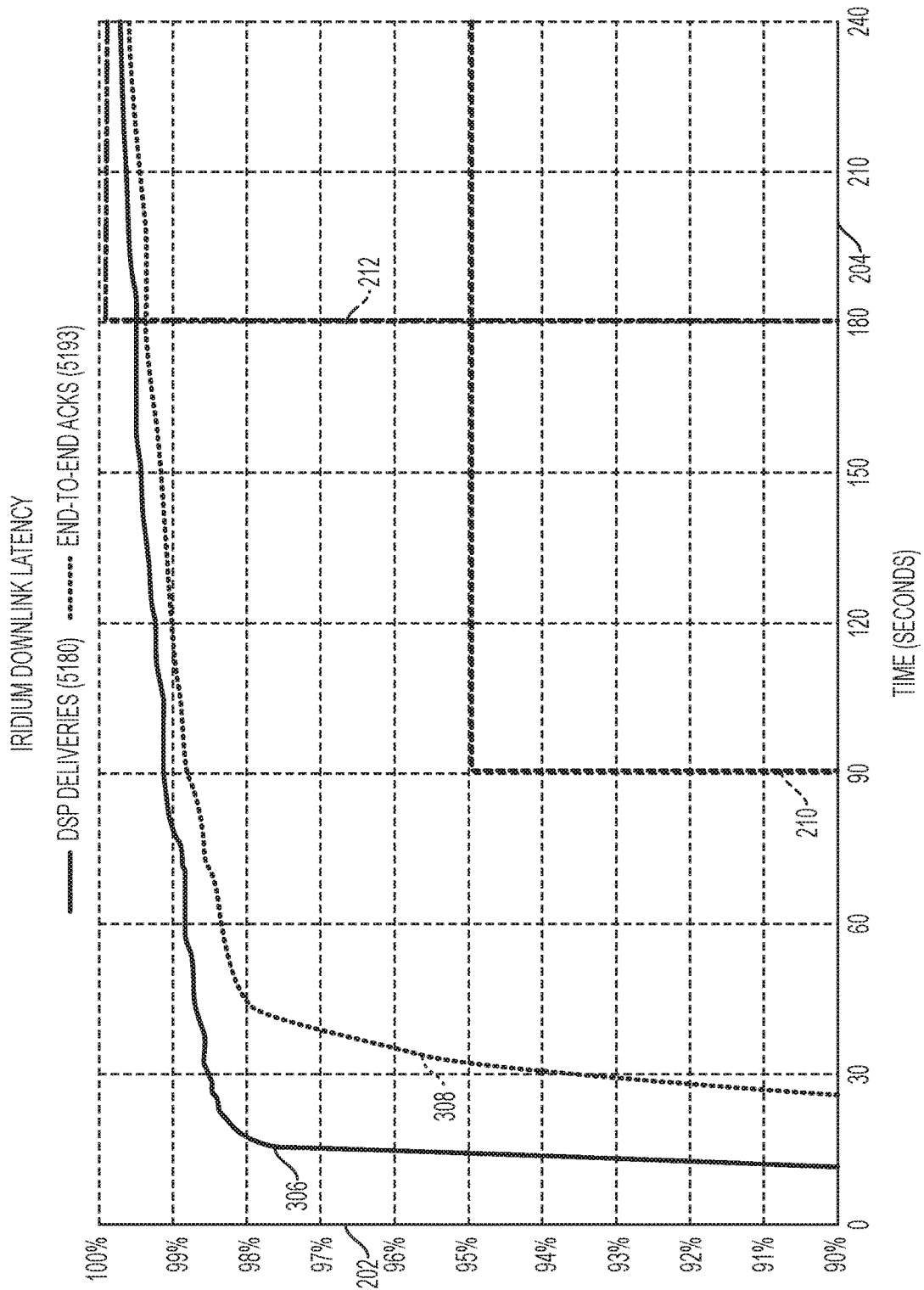
FIG. 3 is a graph of the downlink latency of a global telecommunications network using the virtual message waiting notification or alert of the present invention; and, FIG. 4 is a flow chart illustrating a process for reducing downlink latency in a satellite-based global telecommunications network by using a virtual message alert notification or message alert acknowledgement in the satellite-based global telecommunications network.

FIG. 3 is a graph of the downlink latency of a global telecommunications network using the virtual message waiting notification or alert (e.g., virtual SDB RING) of the present invention. As illustrated by FIG. 3, the generation of a mailbox check (e.g., a poll for a response) (uplink) 20 seconds after a successful downlink conditioned on no message waiting notification or message alert notification (e.g., SDB RING) being received, which is called a virtual message waiting notification or alert (e.g., virtual SDB RING), resulted in the acknowledgement uplinks performance line 308 to vertically match the downlink performance line 306, which indicates the same performance for acknowledgement uplinks as for message downlinks. In order to keep operational costs down and prevent unnecessary system load, the Data Service Providers (DSPs) currently prohibit unsolicited mailbox checks (e.g., mailbox polling or polling for a response). Unlike VHF ACARS, Iridium bi-directional transactions (e.g., SBD transactions) are not a blind unidirectional broadcast. Once we verify that a downlink bi-directional transaction (e.g., SBD transaction) has succeeded, then it is known that an acknowledgement will be ready for retrieval in a few seconds. In about 98% of all cases, a SDU 402 receives a bi-directional transaction (e.g., SBD transaction) within 5-10 seconds and retrieves the acknowledgement uplink. In the remaining 2% of the time, however, the bi-directional transactions (e.g., SBD RINGS) are not received due to the well-known Iridium R/F dropout. Such an acknowledgement (ACK) failure leads to a retransmission of the downlink 180 seconds later. Thus, a complete SBD transaction must occur. On the other hand, if a mailbox check is forced a certain time after expected SBD RING is missed, then no increase in the message traffic would occur. Notably, the virtual SBD RING would actually save one SBD transaction by pro-actively hunting for the mailbox in well-defined cases as the Data Service Provider (DSP), such as SITA, would not need to acknowledge the message twice.

Figure 4:
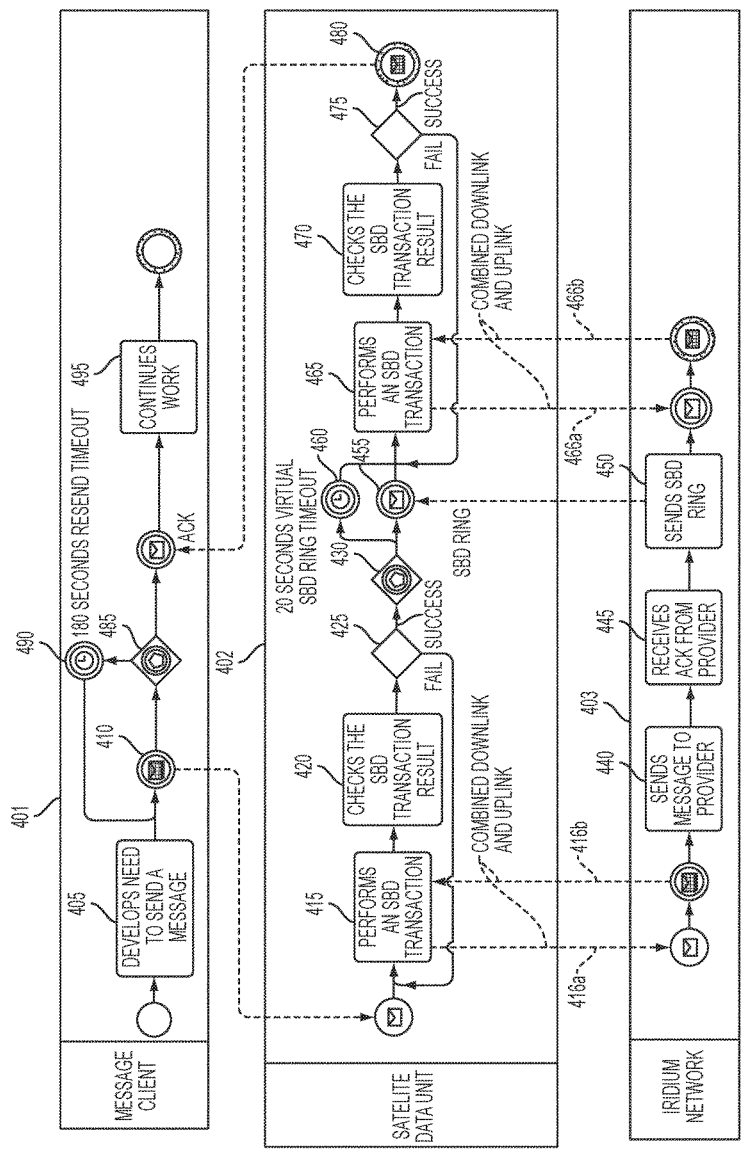

FIG. 4 is a flow chart illustrating a process for reducing downlink latency (e.g., SBD transaction) in a satellite-based global telecommunications network by using a virtual message alert notification (e.g., SBD RING acknowledgement) in the satellite-based global telecommunications network. Beginning in block 405, a message client 401 can desire to send a message over the satellite-based global telecommunications network. In block 410, a composed message from the message client 401 is received by the satellite data unit (SDU) 402. In block 415, the SDU performs a SBD transaction with the satellite-based global telecommunications network 403 via a bi-directional link 416 that is a combined downlink 416a and uplink 416b. In block 420, the success of the SBD transaction is validated and the exclusive event gateway 430 is accessed. Otherwise, if the SBD transaction was unsuccessful, then the SDU 402 will re-try the SBD transaction in block 415. In block 440, the satellite-based global telecommunications network 403 sends the message to a data service provider (DSP). When the satellite-based global telecommunications network 403 receives an acknowledgement message from the DSP in block 445, the satellite-based global telecommunications network 403 sends a SBD RING to the SDU 402 in block 450. Thereafter, in block 455, a SBD RING can be received by the SDU 402. However, if the SDU 402 does not receive the SBD RING, then in block 460 a virtual SBD RING timeout counter can be set when the exclusive event gateway 430 is accessed. In an embodiment, the virtual SBD RING timeout counter can be set for 20 seconds. Once either the SBD RING is received or the virtual SBD RING timeout counter expires, a second SDB transaction (such as a mailbox check) can be generated at block 465 and sent to the satellite-based global telecommunications network 403 via a bi-directional link 466 that is a combined downlink 466a and uplink 466b. In block 470, the success of the SBD transaction is validated and the message is retrieved. Otherwise, if the SBD transaction was unsuccessful, then the SDU 402 will re-try the SBD transaction in block 475. In block 480, the SDU 402 sends the retrieved message to message client 401. Once the message client 401 receives the retrieved message, a resend timeout counter of the message client can be disabled.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A computer implemented method for reducing downlink latency in a satellite-based global telecommunications network by use of a virtual message alert notification, the method comprising:
   performing a bi-directional transaction with the satellite-based global telecommunications network;
   validating the success of the bi-directional transaction;
   proactively determining if a message alert notification was transmitted by the satellite-based global telecommunications network;
   performing a second bi-directional transaction with the satellite-based global telecommunications network and requesting a message receipt acknowledgement of a service provider; and
   upon validating the success of the second bi-directional transaction, receiving the message receipt acknowledgement of a service provider.

2. The computer implemented method of claim 1, further comprising:
   setting a virtual message alert notification timeout counter timer.

3. The computer implemented method of claim 2, further comprising:
   determining if the virtual message alert notification timeout counter timer has expired.

4. The computer implemented method of claim 1 further comprising:
   receiving a message from a message client.

5. The computer implemented method of claim 1 further comprising:
   forwarding the message receipt acknowledgement of a service provider to the message client.

6. The computer implemented method of claim 1, further comprising:
   upon forwarding the message receipt acknowledgement of a service provider to the message client, disabling a resend timeout counter timer of the message client.

7. The computer implemented method of claim 1, wherein the validating the success of the bi-directional transaction indicates that the bi-directional transaction was unsuccessful and re-performing the bi-directional transaction with the satellite-based global telecommunications network.

8. The computer implemented method of claim 1, further comprising:
upon determining the message alert notification was transmitted by the satellite-based global telecommunications network, disabling the virtual message alert timeout counter timer.

9. The computer implemented method of claim 1, wherein the bi-directional transaction is a SBD transaction.

10. A computer program product for reducing downlink latency in a satellite-based global telecommunications network by use of a virtual message alert notification, the computer program product comprising:
a non-transitory computer readable storage medium storing therein computer readable program code embodied therewith, the computer readable program code comprising:
computer readable program code for receiving a message from a message client;
computer readable program code for performing a bi-directional transaction with the satellite-based global telecommunications network;
computer readable program code for validating the success of the bi-directional transaction;
computer readable program code for pro-actively determining if a message alert acknowledgement was transmitted by the satellite-based global telecommunications network;
computer readable program code for determining if the virtual message alert notification counter has expired;
computer readable program code for performing a second bi-directional transaction with the satellite-based global telecommunications network and requesting a message receipt acknowledgement from a service provider; and
upon validating the success of the second bi-directional transaction, computer readable program code for receiving the message receipt acknowledgement of a service provider.

11. The computer program product of claim 10, further comprising:
computer readable program code for setting a virtual message alert notification timeout counter timer.

12. The computer program product of claim 11, further comprising:
computer readable program code for determining if the virtual message alert notification timeout counter timer has expired.

13. The computer program product of claim 10, further comprising:
computer readable program code for receiving a message from a message client.

14. The computer program product of claim 10, further comprising:
computer readable program code for forwarding the message receipt acknowledgement of a service provider to the message client.

15. The computer program product of claim 10, wherein the bi-directional transaction is a SBD transaction.

\* \* \* \* \*